(12) United States Patent
Ahmed (10) Patent No.: US 11,057,324 B1
(45) Date of Patent: Jul. 6, 2021

(54) SYSTEM AND METHOD OF SECURE ANALYSIS FOR ENCRYPTED ELECTRONIC MAIL ATTACHMENTS

(71) Applicant: SAUDI ARABIAN OIL COMPANY, Dhahran (SA)

(72) Inventor: Urfan Ahmed, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/919,751

(22) Filed: Jul. 2, 2020

(51) Int. Cl.
  *G06F 15/16* (2006.01)
  *H04L 12/58* (2006.01)
  *H04L 29/06* (2006.01)

(52) U.S. Cl.
  CPC .............. *H04L 51/08* (2013.01); *H04L 51/10* (2013.01); *H04L 51/12* (2013.01); *H04L 51/22* (2013.01); *H04L 63/083* (2013.01)

(58) Field of Classification Search
  CPC ......... H04L 51/08; H04L 51/10; H04L 51/12; H04L 51/22; H04L 63/083
  USPC ........................................................ 709/206
  See application file for complete search history.

(56) References Cited

U.S. PATENT DOCUMENTS

| 7,730,540 | B1 | 6/2010 | Woirhaye et al. | |
|---|---|---|---|---|
| 8,806,190 | B1* | 8/2014 | Munshi ............... | H04L 63/0428 713/153 |
| 9,584,316 | B1 | 2/2017 | Statica et al. | |
| 9,596,219 | B2* | 3/2017 | Munshi ................... | H04L 51/08 |
| 9,781,083 | B2* | 10/2017 | Munshi ................. | H04L 51/066 |
| 9,813,412 | B1 | 11/2017 | Yang et al. | |
| 9,888,016 | B1 | 2/2018 | Amin et al. | |
| 10,003,558 | B2 | 6/2018 | Gatti et al. | |
| 10,200,346 | B2* | 2/2019 | Munshi ................. | H04L 9/3226 |
| 10,397,198 | B2 | 8/2019 | Gotanda | |
| 10,419,448 | B2* | 9/2019 | Parthasarathy ......... | H04L 63/10 |
| 10,742,616 | B2* | 8/2020 | Munshi ................. | H04L 51/066 |

(Continued)

FOREIGN PATENT DOCUMENTS

| CN | 108352983 A | 7/2018 |
|---|---|---|
| EP | 3076327 A1 | 10/2016 |

(Continued)

*Primary Examiner* — Moustafa M Meky
(74) *Attorney, Agent, or Firm* — Osha Bergman Watanabe & Burton LLP (57) ABSTRACT

A method for analyzing an attachment of an electronic mail (e-mail) transmitted from an external network may include intercepting the e-mail comprising the attachment intended for a recipient. The method may include analyzing the attachment for encryption to identify an encrypted attachment. The method may include determining whether the encrypted attachment has been received previously by the recipient by comparing a hash corresponding to the encrypted attachment against a plurality of hashes stored in an attachment repository. The method may include attempting to open the encrypted attachment using a password from a password repository comprising a plurality of known passwords. The method may include extracting the encrypted attachment from the e-mail upon failing to open the encrypted attachment using the plurality of known passwords. The method may include redirecting the recipient to an interface configured to prompt the recipient for a new password that is associated with the encrypted attachment.

20 Claims, 5 Drawing Sheets

(56) References Cited

U.S. PATENT DOCUMENTS

| | | | |
|---|---|---|---|
| 2015/0052355 A1* | 2/2015 | Munshi | H04L 51/08 713/168 |
| 2016/0308840 A1* | 10/2016 | Munshi | H04L 63/083 |
| 2018/0198799 A1* | 7/2018 | Parthasarathy | H04L 51/08 |
| 2018/0255028 A1* | 9/2018 | Munshi | H04L 63/083 |
| 2019/0386964 A1* | 12/2019 | Munshi | H04L 51/08 |
| 2020/0099695 A1* | 3/2020 | Parthasarathy | H04L 51/08 |

FOREIGN PATENT DOCUMENTS

| | | |
|---|---|---|
| WO | 2005032028 A2 | 4/2005 |
| WO | 2019194411 A1 | 10/2019 |

* cited by examiner

SYSTEM AND METHOD OF SECURE ANALYSIS FOR ENCRYPTED ELECTRONIC MAIL ATTACHMENTS

BACKGROUND

A network perimeter is a border between one network and another. In cyber security, a network perimeter may server as a boundary between a private network, such as an organization's workstations, and a public network, such as the Internet. Perimeter defenses defend the private network against attacks from the public network at the network perimeter. Typical examples of the perimeter defenses include firewalls, intrusion detection systems (IDS), intrusion prevention systems (IPS), application proxies, and virtual private network (VPN) servers. However, the perimeter defenses cannot analyze bypassed encrypted attachments. Therefore, encrypted documents, such as encrypted attachments sent via electronic mails (e-mails) from the public network to the private network, are able to pass the perimeter defenses without being inspected. As a result, malware authors may encrypt files and send the encrypted files as e-mail attachments to infect the private network.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect, embodiments relate to a method for analyzing an attachment of an e-mail transmitted from an external network that includes intercepting, by a computer processor, the e-mail intended for a recipient, the e-mail comprising the attachment. The method includes analyzing, by the computer processor, the attachment for encryption to identify an encrypted attachment. The method includes determining, by the computer processor, whether the encrypted attachment has been received previously by the recipient by comparing a hash corresponding to the encrypted attachment against a plurality of hashes stored in an attachment repository. The method includes attempting to open the encrypted attachment, by the computer processor, using a password from a password repository comprising a plurality of known passwords. The method includes extracting the encrypted attachment from the e-mail, by the computer processor, upon failing to open the encrypted attachment using the plurality of known passwords. The method further includes redirecting, by the computer processor, the recipient to an interface configured to prompt the recipient for a new password that is associated with the encrypted attachment According to one aspect, embodiments relate to a system for analyzing an attachment of an e-mail from an external network. The system includes an extranet comprising an extranet server and an intranet comprising an intranet server. The system further includes security controls and an attachment manager including a computer processor, where the security controls and the attachment manager are coupled to the extranet and the intranet. The attachment manager intercepts the e-mail comprising the attachment intended for a recipient. The attachment manager analyzes the attachment for encryption to identify an encrypted attachment. The attachment manager determines whether the encrypted attachment has been received previously by the recipient by comparing a hash corresponding to the encrypted attachment against a plurality of hashes stored in an attachment repository. The attachment manager attempts to open the encrypted attachment using a password from a password repository comprising a plurality of known passwords. The attachment manager extracts the encrypted attachment from the e-mail upon failing to open the encrypted attachment using the plurality of known passwords. The attachment manager further redirects the recipient to an interface configured to prompt the recipient for a new password that is associated with the encrypted attachment.

According to one aspect, embodiments relate to a non-transitory computer readable medium storing instructions. The instructions intercept an e-mail comprising an attachment intended for a recipient. The instructions analyze the attachment for encryption to identify an encrypted attachment. The instructions determine whether the encrypted attachment has been received previously by the recipient by comparing a hash corresponding to the encrypted attachment against a plurality of hashes stored in an attachment repository. The instructions attempt to open the encrypted attachment using a password from a password repository comprising a plurality of known passwords. The instructions extract the encrypted attachment from the e-mail upon failing to open the encrypted attachment using the plurality of known passwords. The instructions redirects the recipient to an interface configured to prompt the recipient for a new password that is associated with the encrypted attachment.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a system and a method for securely analyzing and processing an attachment of an e-mail intended for a recipient from an external network environment. More specifically, the analysis and process may be realized by an attachment manager. In some embodiments, the method uses hashes and passwords from previously received e-mail attachments to analyze an encrypted attachment of an e-mail received from an external network environment, so that contained files may be decrypted from the attachment and sent to security controls for safety check. In some embodiments, an encrypted attachment that cannot be decrypted using known passwords is extracted from an e-mail and transferred to an attachment manager, and a link directed to the transferred encrypted attachment is sent to the recipient of the e-mail to obtain a new/correct password corresponding to the attachment. Consequently, attachments/files contained in an encrypted attachment of an e-mail from an external network environment are decrypted for safety check before being released to a recipient.

Furthermore, some embodiments of the disclosure provide a method for reutilizing hashes and passwords of received attachments. For example, hashes and passwords of received attachments are added to an attachment repository and a password repository, respectively. These hashes and passwords are used for attempting to decrypt attachments received at a later time. As such, if an attachment is repeatedly received by a recipient, the attachment can be decrypted automatically based on the existing hashes and known passwords. A hash may refer to a string value of specific length that is unique to a file and represents the file. If modifications are made to a file, the hash of the file changes. The name of the file does not affect the hash of the file. A hash of a file is a result of calculation of a Hashing algorithm.

Figure 1:
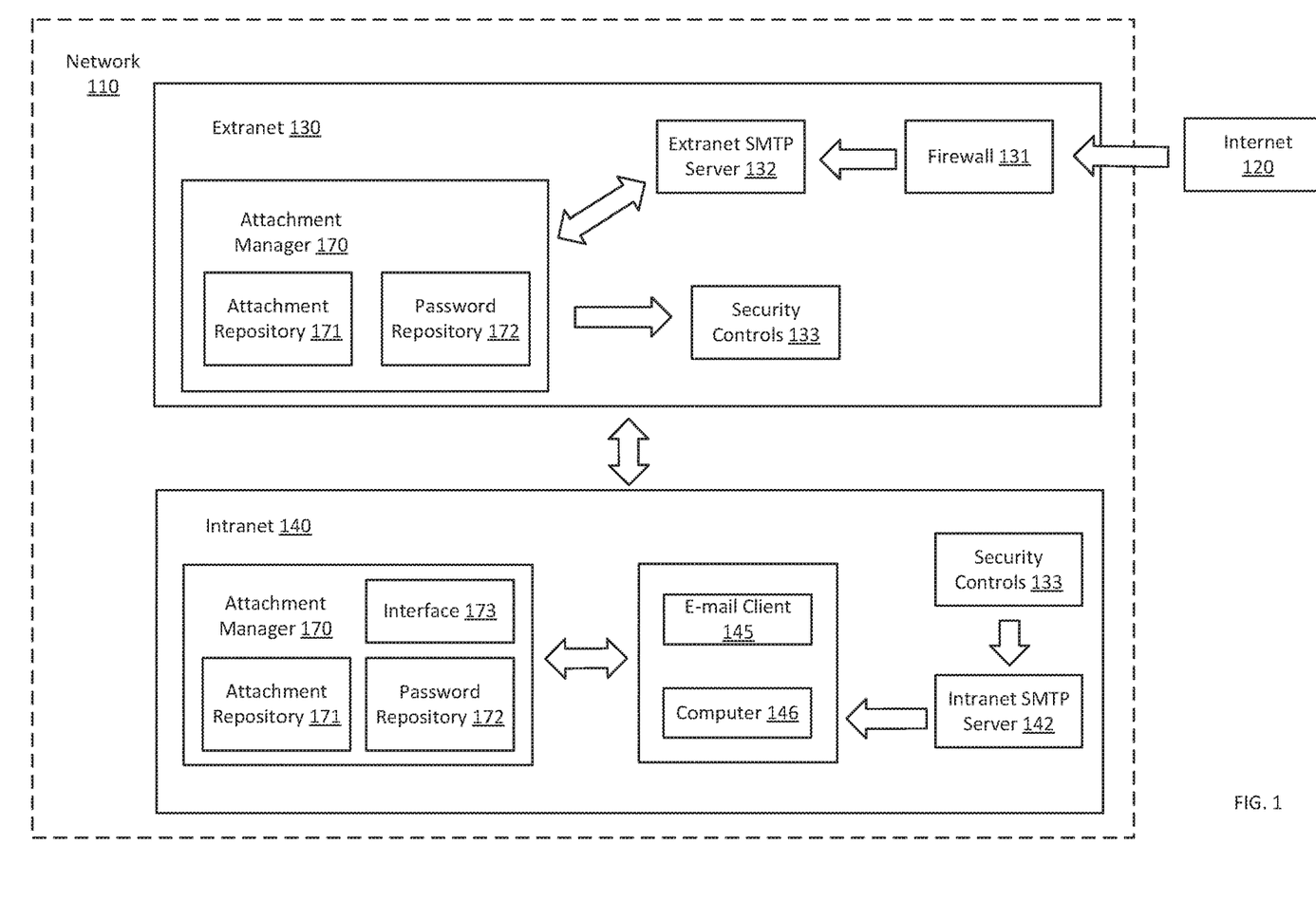
FIG. 1 shows a system in accordance with one or more embodiments.

FIG. 1 shows a block diagram of a system in accordance with one or more embodiments. As shown in FIG. 1, an organization's network (e.g., network (110)) may include an extranet (e.g., extranet (130)) and an intranet (e.g., intranet (140)), where both the extranet and the intranet are coupled to an attachment manager (e.g., attachment manager (170)) and security controls (e.g., security controls (133)). The extranet (130) may refer to a logical or physical network of various connected devices that is used by the organization and is exposed to an external network (e.g., Internet (120)) that is not trustable. More specifically, the extranet (130) may be a controlled private network that allows visitors and authorized users, such as partners, customers, suppliers, and vendors, to get access to specific data without allowing them to access to the organization's entire network.

The intranet (140) may refer to a logical or physical network that contains various resources of the organization, such as data resources, applications, and workstations, and is not exposed to the external network. More specifically, the intranet (140) may be a secure and private network that shares information and services among employees within the organization. The extranet (130) may be viewed as an extension to the intranet (140) so that the intranet is not directly exposed to the Internet (120). As such, security of the intranet (140) is maintained. The Internet (120) may refer to a global system of interconnected networks that is publicly accessible.

The organization may be a corporation, company, or any other suitable entity with employees that use both the intranet and the extranet to communicate.

In one or more embodiments, an attachment manager (170) may be software and/or hardware implemented on the network (110) and includes functionality for managing e-mails received to and from the extranet (130), and corresponding e-mail attachments included in such e-mails. In some embodiments, the extranet (130), intranet (140) and attachment manager (170) may be a computing system similar to the computing system (500) described in FIGS. 5A and 5B, and the accompanying description.

Keeping with FIG. 1, the extranet (130) may include a firewall (e.g., firewall (131)). The firewall (131) refers to a network security system including software and/or hardware that monitors and controls incoming and outgoing network traffic based on predetermined security rules. More specifically, in order to block specific attacks from the Internet (120), the firewall (131) may act as a boundary that includes functionality for filtering traffic and communication between the trusted organization network (110) and the untrusted Internet (120).

The extranet (130) may include an external Simple Mail Transfer Protocol (SMTP) server (e.g., extranet SMTP server (132)). An SMTP server may refer to software and/or hardware that function flowing the SMTP and are used to send and receive e-mails between e-mail senders and receivers, as well as relay e-mails between various SMTP servers and e-mail clients. The extranet SMTP server (132) may act as an initial receiver of all incoming e-mails from the Internet (120) and a sender of all outgoing e-mails to the Internet (120). Furthermore, the extranet SMTP server (132) may relay e-mails from the Internet (120) to another SMTP server in an intranet.

The extranet (130) may include security controls (e.g., security controls (133)). The security controls (133) may refer to software and/or hardware that are used to avoid, detect, counteract, or minimize security risks of an organization's assets. The security controls may include functionalities for checking file type, checking file size, analyzing file headers, and/or sandboxing solutions. In particular, the sandboxing solution may include anti-virus that observes files in order to determine if the files contain malicious contents and detonates the files when necessary. Further, the security controls (133) may include functionality for determining whether a file is safe based on various pre-determined rules set by the organization. In addition, the security controls (133) may include functionality for processing files. For example, in one or more embodiments, upon determining a file is safe, the security controls (133) may transmit the file to the intranet (140). Similarly, upon determining a file is infected or not qualified, the security controls (133) may delete the infected file and notify the recipient that the file is unavailable. In some embodiments, functionalities of security controls may be performed in an intranet that will be further described.

Keeping with FIG. 1, the intranet (140) may include an internal SMTP server (e.g., intranet SMTP server (142)). In contrast to the extranet SMTP server (132), the intranet SMTP server (142) may receive external e-mails relayed from the extranet SMTP server (132) and relay e-mails to the extranet SMTP server (132) which are then transmitted to the Internet (120).

The intranet (140) may include an e-mail client (e.g., e-mail client (145)) and a computer (e.g., computer (146)). The e-mail client (145) may refer to an application that manages a user's (recipient's) e-mails. For example, popular e-mail clients include Microsoft Outlook, Mozilla Thunderbird, macOS Mail, iOS Mail, and etc. The e-mail client (145) may download messages from the intranet SMTP server (142) for local use and upload messages to the intranet SMTP server (142) to further deliver the messages to the intended recipients. In some embodiments, the user, such as the e-mail recipient, may get access to and manage various e-mails though the e-mail client (145). The computer (146) may refer to a system that includes functionality for running the e-mail client (145) connecting the user to the intranet (140). For example, the computer (146) may be any computing device such as a desktop, laptop, thin client, smart phone, tablet or any other suitable electronic device with a processor and memory for storing and executing applications such as the e-mail client (145).

The intranet (140) may include security controls that is similar to the security controls (133) included in the extranet (130). More specifically, the security controls in the intranet (140) may include the functionalities of the security controls (133) described in the extranet (130) and the accompanying description.

Continuing with FIG. 1, in some embodiments, the attachment manager (170) may include an attachment repository (171), a password repository (172), and an interface (173). As described above, certain functionalities of the attachment manager (170) may be shared between the extranet (130) and the intranet (140) of the organization. In some embodiments, the attachment repository (171) may refer to a database that includes functionality for storing encrypted attachments extracted from e-mails and hashes corresponding to various encrypted attachments of various e-mails previously received from the Internet (120). In one or more embodiments, the password repository (172) may refer to a database that includes functionality for storing passwords corresponding to various encrypted attachments of corresponding e-mails previously received from the Internet (120). The attachment manager (170) on the intranet (140) side may include the interface (173).

The interface (173) may refer to a web-based user friendly front end that includes functionality for allowing interaction with the attachment repository (171) and the password repository (172). For example, the interface (173) may be associated with a stored encrypted attachment and prompt a user to provide a password associated with the stored encrypted attachment. In particular, the attachment repository (171) and the password repository (172) may be available and accessible in both the extranet (130) and the intranet (140).

In one or more embodiments, the attachment manager (170) may include functionality for analyzing an e-mail received from the Internet (120). For example, the attachment manager (170) may download from the extranet SMTP server (132) an e-mail received from the Internet (120). The attachment manager (170) may analyze the e-mail to determine whether the e-mail contains an attachment.

Furthermore, in one or more embodiments, the attachment manager (170) includes functionality for analyzing and managing an attachment of an e-mail. For example, the attachment manager (170) may determine whether an attachment of an e-mail is encrypted. The attachment manager (170) may intercept an e-mail including an encrypted attachment from being relayed to the intranet SMTP server (142). The attachment manager (170) is configured to compare hash of the encrypted attachment against various hashes stored in the attachment repository (171). The attachment manager (170) may attempt to decrypt the encrypted attachment using various known passwords stored in the password repository (172). The attachment manager (170) subsequently extracts the encrypted attachment from the e-mail and transfers the encrypted attachment to the attachment repository (171), when the encrypted attachment cannot be decrypted using known passwords from the password repository (172).

In one or more embodiments, the attachment manager (170) includes functionality for generating links. For example, the attachment manager (170) may generate a link pointing to an encrypted attachment transferred to the attachment repository (171), wherein the link is accessible to a recipient in the e-mail client (145) and redirects the recipient to the interface (173). In one or more embodiments, the attachment manager (170) includes functionality for embedding the generated links in the e-mail. The attachment manager (170) obtains a new password corresponding to the encrypted attachment by prompting the recipient to enter the password in the interface (173). In particular, the recipient obtains the password corresponding to the encrypted attachment through methods other than an e-mail. For example, the recipient may obtain the password via instant messaging applications, phone calls, short message service (SMS), and etc. By doing so, it is likely to reduce risks of intercepting password information and improve network security. If the password is correct, the attachment manager (170) adds the correct password to the password repository (172). As such, the attachment manager (170) may decrypt the encrypted attachment using the correct password.

In one or more embodiments, the attachment manager (170) may include functionality for collecting data and using that data to generate the attachment repository (171) and the password repository (172). For example, upon receiving various e-mails containing various encrypted attachments, hashes of the encrypted attachments are obtained and stored in the various attachment repository (171). Upon successfully decrypting various encrypted attachments, passwords corresponding to the various attachments are obtained and stored in the password repository (172).

Furthermore, in one or more embodiments, the attachment manager (170) includes functionality for transmitting files to the security controls (133). For example, upon decrypting an encrypted attachment, various files are obtained. The various files are transmitted to the security controls (133) before being sent to the intranet SMTP server (142), where the files are checked for authenticity.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
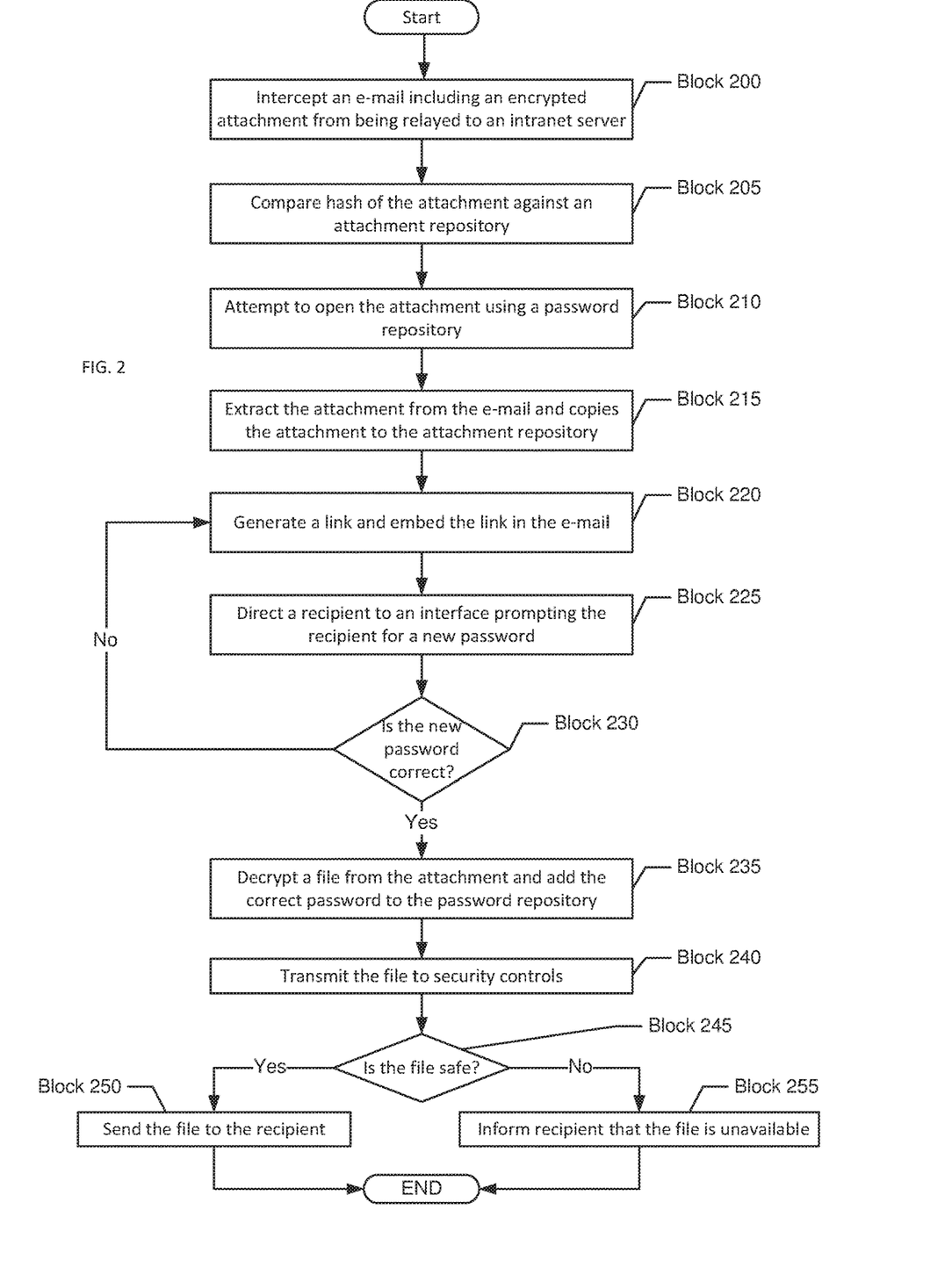
FIG. 2 shows a flowchart in accordance with one or more embodiments.

Turning to FIG. 2, FIG. 2 shows a flowchart in accordance with one or more embodiments. Specifically, FIG. 2 describes a general method for analyzing and managing an encrypted attachment of an e-mail from an external network. One or more blocks in FIG. 2 may be performed by one or more components (e.g., attachment manager (170)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, an e-mail including an encrypted attachment is intercepted. For example, an e-mail from the Internet is received by an extranet SMTP server. Upon determining that the e-mail contains an encrypted attachment, the e-mail is intercepted from being relayed to an internet SMTP server.

In Block 205, hash of the encrypted attachment is compared against a plurality of stored hashes in accordance with one or more embodiments. For example, hash of the encrypted attachment may be compared against various hashes stored in an attachment repository included in an attachment manager. In particular, if the hash of the encrypted attachment exists in the attachment repository, it means that the encrypted attachment was received before and a corresponding password that may be used to decrypt the attachment also exists in a password repository included in the attachment manager.

In Block 210, the encrypted attachment is attempted to be opened using various known passwords in accordance with one or more embodiments. For example, known passwords stored in the password repository may be used to attempt to open the encrypted attachment, regardless of whether hash of the encrypted attachment exists in the attachment repository. In particular, for a previously received encrypted attachment, the same password previously used can be used again to decrypt the encrypted attachment. Further, one or more known passwords may correspond to an encrypted attachment that is never received before.

In Block 215, the encrypted attachment is extracted from the e-mail and is transferred to the attachment repository in accordance with one or more embodiments. For example, upon failing to decrypt the encrypted attachment using the known passwords stored in the password repository, the encrypted attachment is extracted from the e-mail and is transferred to the attachment repository. As such, the hash of the encrypted attachment is stored in the attachment repository.

In Blocks 220 and 225, a link that redirects the recipient to an interface is generated and embedded in the e-mail in accordance with one or more embodiments. For example, the attachment manager may generate the link directing the recipient of the e-mail towards the interface included in the attachment manager that prompts the recipient for a correct and currently unknown password corresponding to the encrypted attachment. In alternate embodiments, the user may be notified that they must access an internal e-mail or webpage pointed to by the generated link to retrieve the encrypted attachment sent with the original e-mail. In one or more embodiments, the generated link is a Uniform Resource Locator (URL) which is a reference to a web resource that specifies its location on a computer network and a mechanism for retrieving it. In particular, the link points to the extracted encrypted attachment transferred from the e-mail to the attachment repository and is embedded in the e-mail with the attachment extracted. Upon embedded the link, the e-mail is relayed from the attachment repository to the intranet SMTP server, so that the recipient may download the e-mail from the intranet SMTP server through an e-mail client. Upon clicking on the link, the recipient is redirected to the interface in the attachment manager and is prompted to enter the new password corresponding to the encrypted attachment.

In Block 230, a determination is made as to whether the password entered in Block 225 is correct in accordance with one or more embodiments. If the entered password is not correct, the process proceeds to Block 220 and repeats the processes between Blocks 220-230 until a correct password is entered. If the password is correct, the process proceeds to Block 235.

In Block 235, the encrypted attachment is decrypted using the correctly entered password, and the correct password is added to the password repository in accordance with one or more embodiments. For example, upon entering the correct password by the recipient, the encrypted attachment can be decrypted, making various files contained in the encrypted attachment available. The correct password is added to the password repository for later use.

In Block 240, various decrypted files are transmitted to security controls in accordance with one or more embodiments. In particular, the security controls that verify the integrity of the decrypted files may be updated on a regularly basis. As such, a file that previously passes the security controls does not necessarily mean that the file is currently safe. Therefore, regardless of whether the encrypted attachment has been received before, various files contained in the encrypted attachment are passed through the security controls again.

In Block 245, a determination is made as to whether the various decrypted files are safe in accordance with one or more embodiments. If the decrypted files are safe, the process proceeds to Block 250, where the safe files are sent to the recipient of the e-mail. If various decrypted files are deemed as not safe, the process proceeds to Block 255, where the recipient is informed that the files are not available. The process ends after Blocks 250 and 255

Those skilled in the art will appreciate that the process of FIG. 2 may be repeated for each e-mail that is received by the organization's network.

Figure 3:
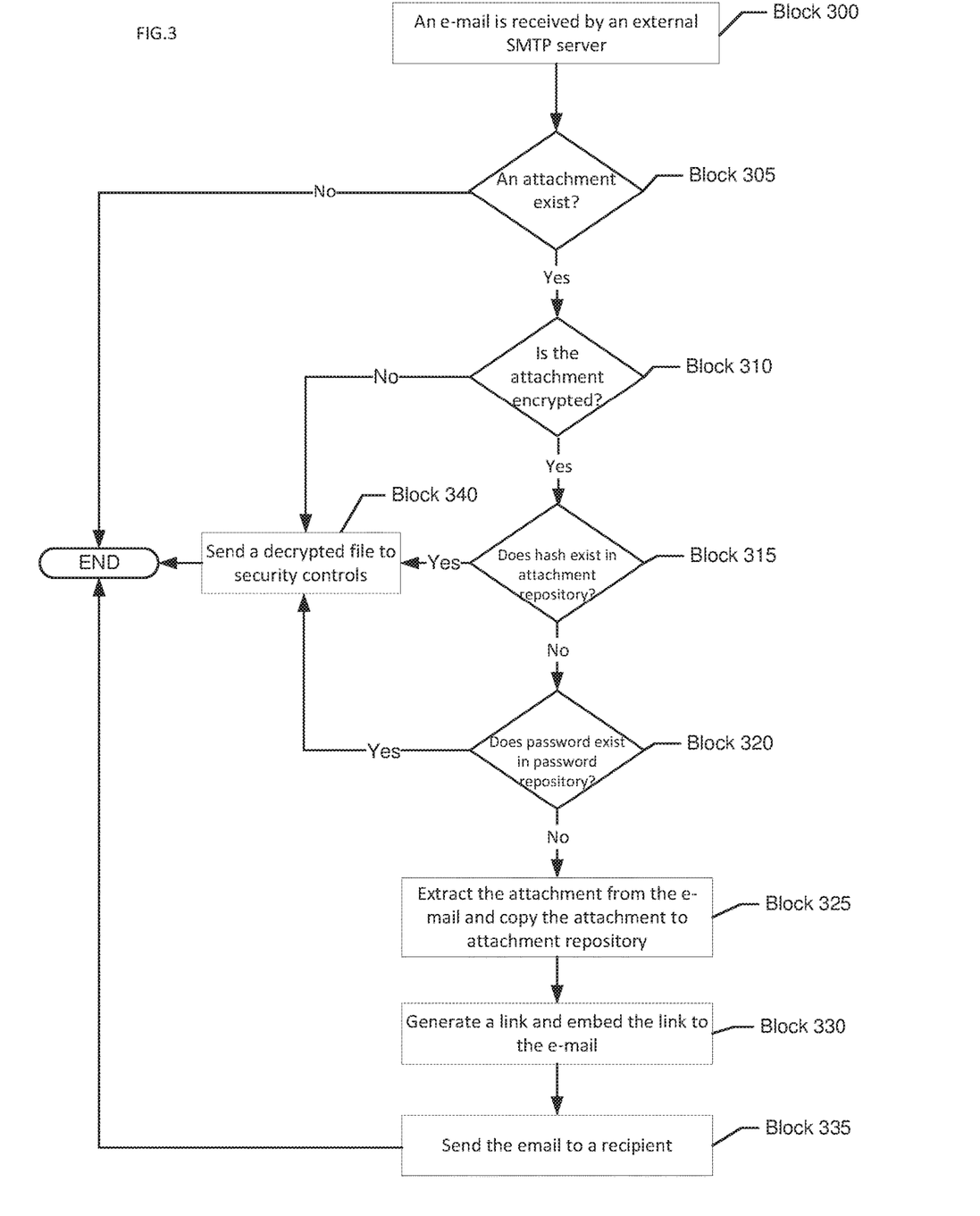
FIG. 3 shows a flowchart in accordance with one or more embodiments.

Turning to FIG. 3, FIG. 3 shows a flowchart in accordance with one or more embodiments. Specifically, FIG. 3 describes a process performed in an extranet for analyzing an e-mail received from an external network. One or more blocks in FIG. 3 may be performed by one or more components (e.g., attachment manager (170)) as described in FIG. 1. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, an e-mail from an external network is received by an extranet SMTP server in accordance with one or more embodiments. For example, upon successfully bypassing a firewall, the e-mail from the Internet is received by the extranet SMTP server.

In Block 305, a determination is made as to whether an attachment exits in the e-mail in accordance with one or more embodiments. If no attachment exists, the process ends. If an attachment exists as part of the e-mail, the process proceeds to Block 310. In particular, more than one attachment may be sent as part of the e-mail. The process described in FIG. 3 may refer to analysis for each of the attachments in parallel or individually. In one or more embodiments, the determination in Block 305 may be performed by an attachment manager.

In Block 310, a determination is made as to whether the attachment is encrypted in accordance with one or more embodiments. If the attachment is not encrypted, the process proceeds to Block 340. If the attachment is encrypted, the process proceeds to Block 315. In one or more embodiments, the determination in Block 310 may be performed by the attachment manager.

In Block 340, various decrypted files are sent to security controls in accordance with one or more embodiments. For example, various decrypted files may be sent to the security controls by the attachment manager as described in Block 240 and the accompanying description. The process ends after Block 340.

In Block 315, a determination is made as to whether hash of the encrypted attachment exists in an attachment repository included in the attachment manager in accordance with one or more embodiments. For example, hash of the encrypted attachment may be compared against various hashes stored in the attachment repository. If hash of the encrypted attachment exists in the attachment repository, the encrypted attachment may be decrypted using a known password corresponding to the hash, and the process proceeds to Block 340. If hash of the encrypted attachment does not exist in the attachment repository, the process proceeds to Block 320. In one or more embodiments, the determination in Block 315 may be performed by the attachment manager.

In Block 320, a determination is made as to whether a password corresponding to the encrypted attachment exists in a password repository included in the attachment manager in accordance with one or more embodiments. For example, various known passwords stored in the password repository are used for attempting to decrypt an encrypted attachment. More specifically, the various known passwords may be tested for the determination concurrently using multiple threads for speed concerns. In particular, the determination is made when either one of the known passwords successfully decrypts the encrypted attachment or none of the known passwords decrypts the encrypted attachment. If a password corresponding to the encrypted attachment exists in the password repository, the attachment is decrypted using the known password, and the process proceeds to Block 340. If a password corresponding to the encrypted attachment does not exist in the password repository, the process proceeds to Block 325. In one or more embodiments, the determination in Block 320 may be performed by the attachment manager.

In Block 325, the encrypted attachment is extracted from the e-mail and is transferred to the attachment repository in accordance with one or more embodiments. For example, upon failing to decrypt the encrypted attachment using known passwords stored in the password repository, the encrypted attachment is extracted from the e-mail and is transferred to the attachment repository.

In Block 330, a link is generated and embedded to the e-mail in accordance with one or more embodiments. For example, the link may be generated and embedded by the attachment manager as described Blocks 220-225 and the accompanying description.

In Block 335, the e-mail is sent to a recipient in accordance with one or more embodiments. For example, the e-mail from which the encrypted attachment is extracted is embedded with the link and is relayed to the intranet SMTP server, so that the recipient has access to the e-mail in an e-mail client. The process ends at Block 335.

Figure 4:
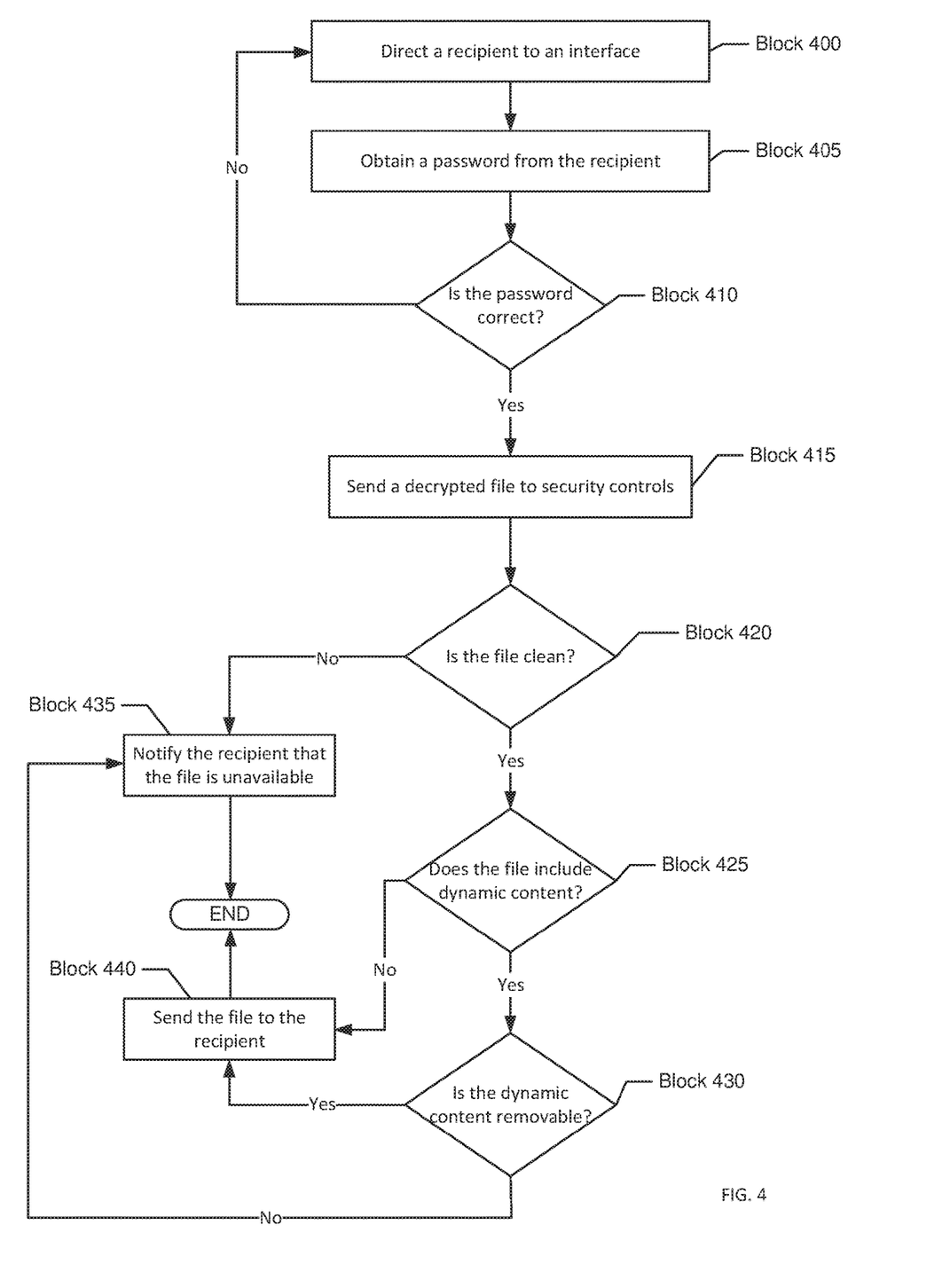
FIG. 4 shows a flowchart in accordance with one or more embodiments.

Turning to FIG. 4, FIG. 4 shows a flowchart in accordance with one or more embodiments. Specifically, FIG. 4 describes a process performed in an intranet for analyzing an encrypted attachment. One or more blocks in FIG. 4 may be performed by one or more components (e.g., attachment manager (170)) as described in FIG. 1. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, a recipient of an e-mail from which an encrypted attachment is extracted is directed to an interface in accordance with one or more embodiments. For example, upon receiving the e-mail embedded with a link pointing to an extracted encrypted attachment in an attachment repository included in an attachment manager, the recipient clicks on the link and is directed to the interface included in the attachment manger.

In Block 405, a password is obtained from the recipient in accordance with one or more embodiments. For example, the interface prompts the recipient for a new password corresponding to the extracted encrypted attachment transferred to the attachment repository.

In Block 410, a determination is made as to whether the password is correct in accordance with one or more embodiments. For example, the recipient enters the new password in the interface. If the entered password is the correct password corresponding to the encrypted attachment transferred to the attachment repository, the encrypted attachment can be decrypted to achieve a contained file and the process proceeds to Block 415. More specifically, in one or more embodiments, the entered password may be determined as correct upon successfully decrypting the encrypted attachment, or upon detecting that the encrypted attachment's length is expended. In one or more embodiments, a dialogue box may appear in the interface to inform the recipient the determination result. In particular, the correct password is added to a password repository. If a password is not correct, the process repeats Blocks 400-410 until a correct password is obtained. In particular, the recipient obtains the correct password corresponding to the encrypted attachment through a separate method as described in FIG. 1 and the accompanying description. In one or more embodiments, the determination in Block 410 may be performed by the attachment manager.

In Block 415, the decrypted file is transmitted to security controls in accordance with one or more embodiments. For example, the file decrypted from the encrypted attachment may be sent to the security controls by the attachment manager.

In Block 420, a determination is made as to whether the decrypted file is clean in accordance with one or more embodiments. For example, if the decrypted file is not clean, the process proceeds to Block 435 to inform the recipient that the file is unavailable. If the decrypted file is clean, the process proceeds to Block 425 to further analyze the file. In one or more embodiments, the determination in Block 420 may be performed by the security controls.

In Block 425, a determination is made if the decrypted file includes dynamic content in accordance with one or more embodiments. Dynamic content may refer to an e-mail component or website component that constantly or regularly changes based on users' behaviors, preference, or interest, and is powered by scripts. In one or more embodiments, dynamic content may be a macro in a Microsoft Office document and/or scripts in an Adobe Portable Document Format (PDF) document. Other examples of dynamic content include Hyper Text Markup Language (HTML) 5, Java content, Dynamic Data Exchange (DDE) script, and Object linking and Embedding (OLE) embedded files. A macro may refer to a set of commands or instructions that can be used to automate a task on a repeatedly or regular basis. If dynamic content does not exist, the process proceeds to Block 440 so that the file is sent to a recipient. If dynamic content exists, the process proceeds to Block 430. In one or more embodiments, the determination in Block 425 may be performed by the security controls.

In Block 430, a determination is made whether dynamic content in the file is removable in accordance with one or more embodiments. If dynamic content is removable, the dynamic content is removed from the file before sending the file to the recipient in Block 440. If dynamic content is not removable, the process proceeds to Block 435 to inform the recipient that the file containing the dynamic content is not available. The process ends after Blocks 435 and 440. In particular, unavailable files from Blocks 420-430 may be deleted or detonated by the security controls. In addition, more than one files may be decrypted from the encrypted attachment as described in Block 410. The process described in Blocks 415-430 may refer to analysis for each of the decrypted file in parallel or individually.

Figure 5A:
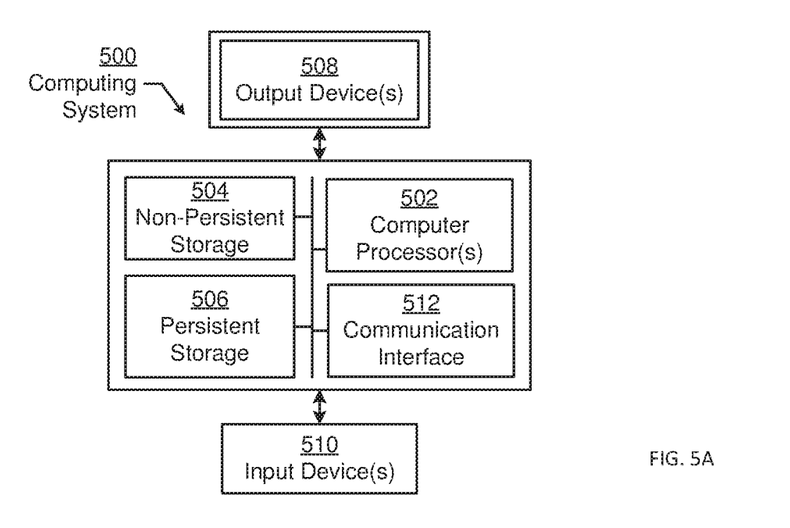
FIGS. 5A and 5B show a computing system in accordance with one or more embodiments.

FIG. 5A shows a computing system in accordance with one or more embodiments. Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device. In one or more embodiments, the computer processor(s) (502) may be included in the attachment manager (170) as described in FIG. 1 and the accompanying description.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms. In one or more embodiments, the one or more output devices (508) may be the computer (146) as described in FIG. 1 and the accompanying description.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 5B:
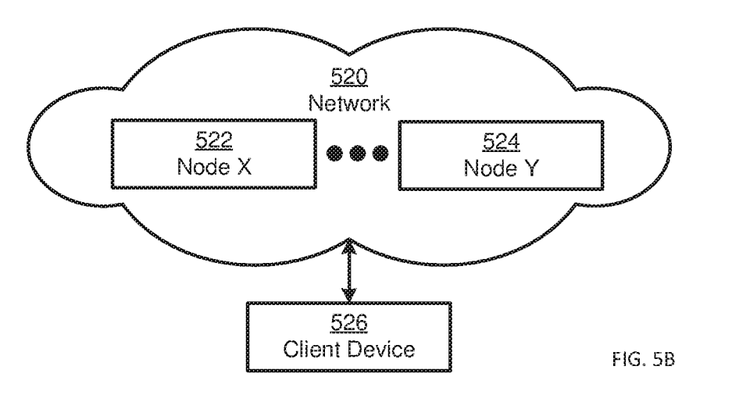

The computing system (500) in FIG. 5A may be connected to or be a part of a network, for example, the network (110) as described in FIG. 1 and the accompanying description. As shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the disclosure.

The computing system or group of computing systems described in FIGS. 5A and 5B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a URL link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in HTML that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the disclosure, may perform data comparison. Data comparison may be used to compare two or more data values (e.g., A, B). For example, one or more embodiments may determine whether $A>B$, $A=B$, $A\;!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases. In one or more embodiments, the data repository may be the attachments repository (171) and password repository (172) as described in FIG. 1 and the accompanying description.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for analyzing an attachment of an electronic mail (e-mail) transmitted from an external network, comprising:
    intercepting, by a computer processor, the e-mail intended for a recipient, the e-mail comprising the attachment;
    analyzing, by the computer processor, the attachment for encryption to identify an encrypted attachment;
    determining, by the computer processor, whether the encrypted attachment has been received previously by the recipient by comparing a hash corresponding to the encrypted attachment against a plurality of hashes stored in an attachment repository;
    attempting to open the encrypted attachment, by the computer processor, using a password from a password repository comprising a plurality of known passwords;
    extracting the encrypted attachment from the e-mail, by the computer processor, upon failing to open the encrypted attachment using the plurality of known passwords; and
    redirecting, by the computer processor, the recipient to an interface configured to prompt the recipient for a new password that is associated with the encrypted attachment.

2. The method of claim 1, further comprising:
    generating, by the computer processor, the attachment repository comprising the plurality of stored hashes, generating, by the computer processor, the password repository comprising the plurality of known passwords, wherein the plurality of stored hashes and the plurality of known passwords correspond to a plurality of attachments that have been previously received by the recipient.

3. The method of claim 1, wherein the removed encrypted attachment is transferred to the attachment repository.

4. The method of claim 3, further comprising:

generating, by the computer processor, a link associated with the encrypted attachment transferred to the attachment repository, transferring, by the computer processor, the e-mail having the encrypted attachment extracted to an intranet server, wherein the link is embedded in the email transferred to the intranet server and redirects the recipient to the interface.

5. The method of claim 1, further comprising:

decrypting, by the computer processor, the encrypted attachment upon correctly entering the new password by the recipient, transmitting, by the computer processor, a file decrypted from the encrypted attachment to security controls, adding the new password to the password repository.

6. The method of claim 5, further comprising:

determining, by the security controls, whether the file is safe, wherein a safe file is transmitted to the recipient, wherein an unsafe filed is removed and the recipient is notified that the file is unavailable.

7. The method of claim 1, wherein the recipient obtains the new password via methods comprising instant messaging applications, phone calls, and short message service, and excluding e-mails.

8. A system for analyzing an attachment of an electronic mail (e-mail) from an external network, comprising:

an extranet comprising an extranet server, an intranet comprising an intranet server, security controls coupled to the extranet and the intranet, and an attachment manager comprising a computer processor, coupled to the extranet and the intranet, wherein the attachment manager is configured to:

intercept the e-mail intended for a recipient, the e-mail comprising the attachment;

analyze the attachment for encryption to identify an encrypted attachment;

determine whether the encrypted attachment has been received previously by the recipient by comparing a hash corresponding to the encrypted attachment against a plurality of hashes stored in an attachment repository;

attempt to open the encrypted attachment using a password from a password repository comprising a plurality of known passwords;

extract the encrypted attachment from the e-mail upon failing to open the encrypted attachment using the plurality of known passwords; and redirect the recipient to an interface configured to prompt the recipient for a new password that is associated with the encrypted attachment.

9. The system of claim 8, the attachment manager is further configured to:

generate the attachment repository comprising the plurality of stored hashes, generate the password repository comprising the plurality of known passwords, wherein the plurality of stored hashes and the plurality of known passwords correspond to a plurality of attachments that have been previously received by the recipient.

10. The system of claim 8, wherein the removed encrypted attachment is transferred to the attachment repository.

11. The system of claim 10, the attachment manager is further configured to:

generate a link associated with the encrypted attachment transferred to the attachment repository, transfer the e-mail having the encrypted attachment extracted to the intranet server, wherein the link is embedded in the e-mail transferred to the intranet server and redirects the recipient to the interface.

12. The system of claim 8, the attachment manager is further configured to:

decrypt the encrypted attachment upon correctly entering the new password by the recipient, transmit a file decrypted from the encrypted attachment to the security controls, add the new password to the password repository.

13. The system of claim 12, wherein the security controls is configured to:

determine whether the file is safe, wherein a safe file is transmitted to the recipient, wherein an unsafe filed is removed and the recipient is notified that the file is unavailable.

14. The system of claim 8, wherein the recipient obtains the new password via methods comprising instant messaging applications, phone calls, and short message service, and excluding e-mails.

15. A non-transitory computer readable medium storing instructions executable by a computer processor, the instructions comprising functionality for:

intercepting an e-mail intended for a recipient, the e-mail comprising an attachment;

analyzing the attachment for encryption to identify an encrypted attachment;

determining whether the encrypted attachment has been received previously by the recipient by comparing a hash corresponding to the encrypted attachment against a plurality of hashes stored in an attachment repository;

attempting to open the encrypted attachment using a password from a password repository comprising a plurality of known passwords;

extracting the encrypted attachment from the e-mail upon failing to open the encrypted attachment using the plurality of known passwords; and redirecting the recipient to an interface configured to prompt the recipient for a new password that is associated with the encrypted attachment.

16. The non-transitory computer readable medium of claim 15, wherein the instructions further comprise functionality for:

generating the attachment repository comprising the plurality of stored hashes, generating the password repository comprising the plurality of known passwords, wherein the plurality of stored hashes and the plurality of known passwords correspond to a plurality of attachments that have been previously received by the recipient.

17. The non-transitory computer readable medium of claim 15, wherein the extracted encrypted attachment is transferred to the attachment repository.

18. The non-transitory computer readable medium of claim 17, wherein the instructions further comprise functionality for:
   generating a link associated with the encrypted attachment transferred to the attachment repository; and
   transferring the e-mail having the encrypted attachment extracted to an intranet server,
   wherein the link is embedded in the e-mail transferred to the intranet server and redirects the recipient to the interface.

19. The non-transitory computer readable medium of claim 15, wherein the instructions further comprise functionality for:
   decrypting the encrypted attachment upon correctly entering the new password by the recipient;
   transmitting a file decrypted from the encrypted attachment to security controls; and
   adding the new password to the password repository.

20. The non-transitory computer readable medium of claim 15, wherein the instructions further comprise functionality for:
   determining whether the file is safe,
   wherein a safe file is transmitted to the recipient,
   wherein an unsafe filed is removed and the recipient is notified that the file is unavailable.

* * * * *